US007218902B2

(12) United States Patent
Disco

(10) Patent No.: US 7,218,902 B2
(45) Date of Patent: May 15, 2007

(54) ANTENNA FOR COMMUNICATION WITH A SATELLITE

(75) Inventor: Daniele Disco, Turin (IT)

(73) Assignee: Telecom Italia S.p.A., Milan (IT)

( * ) Notice: Subject to any disclaimer, the term of this patent is extended or adjusted under 35 U.S.C. 154(b) by 7 days.

(21) Appl. No.: 10/535,950

(22) PCT Filed: Nov. 29, 2002

(86) PCT No.: PCT/IT02/00752

§ 371 (c)(1),
(2), (4) Date: May 24, 2005

(87) PCT Pub. No.: WO2004/051802

PCT Pub. Date: Jun. 17, 2004

(65) Prior Publication Data

US 2006/0046637 A1 Mar. 2, 2006

(51) Int. Cl.

| | |
|---|---|
| ***H04B 1/18*** | (2006.01) |
| ***H04B 1/06*** | (2006.01) |
| ***H04B 7/00*** | (2006.01) |
| ***H04M 1/00*** | (2006.01) |
| ***H01Q 19/06*** | (2006.01) |
| ***H01Q 3/00*** | (2006.01) |

(52) U.S. Cl. ................ 455/193.1; 455/269; 455/279.1; 455/575.7; 343/757; 343/754

(58) Field of Classification Search ............... 455/13.3, 455/562.1, 575.7, 121, 269, 193.1, 279.1; 342/359; 343/751, 770, 824, 757, 754, 765
See application file for complete search history.

(56) References Cited

U.S. PATENT DOCUMENTS 4,833,484 A 5/1989 Garrood et al.
5,398,035 A 3/1995 Densmore et al.
5,818,385 A * 10/1998 Bartholomew .............. 342/372
5,929,819 A * 7/1999 Grinberg .................... 343/754
5,945,946 A * 8/1999 Munger ...................... 342/367
6,009,307 A * 12/1999 Granata et al. ............ 455/13.3
6,067,047 A * 5/2000 Cook et al. ................. 342/372

(Continued)

FOREIGN PATENT DOCUMENTS

EP 0838876 B1 9/2003

OTHER PUBLICATIONS

Godara; "Applications of Antenna Arrays to Mobile Communications, Part I: Performance Improvement, Feasibility, and System Considerations"; Proceedings of the IEEE, vol. 85, No. 7, pp. 1031-1060, (1997).

(Continued)

*Primary Examiner*—Lana Le
*Assistant Examiner*—Andrew Wendell
(74) *Attorney, Agent, or Firm*—Finnegan, Henderson, Farabow, Garrett & Dunner, L.L.P.

(57) ABSTRACT

A telecommunication system uses a satellite antenna showing on the horizontal plane, a sufficiently narrow radiation lobe to discriminate two adjacent satellites and showing on the vertical plane, a sufficiently narrow vertical lobe to ensure an adequate gain, but sufficiently ample to enable the reception of a certain number of satellites in adjacent orbital positions, by land stations distributed over a certain meridian arc without the necessity for antenna elevation angle variations.

18 Claims, 1 Drawing Sheet

U.S. PATENT DOCUMENTS

| | | | | |
|---|---|---|---|---|
| 6,184,827 | B1 | 2/2001 | Dendy et al. | |
| 6,339,611 | B1 * | 1/2002 | Antonio et al. | 375/130 |
| 2002/0089462 | A1 * | 7/2002 | Monzon | 343/761 |
| 2002/0167449 | A1 | 11/2002 | Frazita et al. | |
| 2003/0052825 | A1 * | 3/2003 | Rao et al. | 343/700 MS |
| 2003/0197637 | A1 * | 10/2003 | Lalezari | 342/354 |
| 2003/0234744 | A1 * | 12/2003 | Podger | 343/742 |
| 2005/0219134 | A1 * | 10/2005 | Sergey | 343/770 |

OTHER PUBLICATIONS

Schrewe; "An Adaptive Antenna Array for Mobile Reception of DBS-Satellites"; Vehicular Technology Conference, IEEE, 44th Stockholm, Sweden, pp. 1494-1497, (1994).

* cited by examiner

ANTENNA FOR COMMUNICATION WITH A SATELLITE

CROSS REFERENCE TO RELATED APPLICATION

This application is a national phase application based on PCT/IT2002/000752, filed Nov. 29, 2002, the content of which is incorporated herein by reference.

BACKGROUND OF THE INVENTION

1. Field of the Invention

This invention refers to telecommunication systems and it concerns in particular a satellite telecommunication system.

2. Description of the Related Art

Within the sphere of telecommunications, stationary satellites cover an ever more important role, both for television connections and for all the other applications, where they are used as transponders, for example in telephone communications.

As it is known, these satellites are located at a height of approximately 36,000 km in an orbit contained in the plane passing by the terrestrial equator. At this height, the speed, which this satellite must have to keep its position in the orbit, nullifying the gravitational pull force coincides with the earth rotation speed. The final result for an observer on the Earth, is that of seeing the fixed satellite in a precise position on the horizon. The choice of the orbital position (15 ° East, 28° West etc.) is made to stay, as much as possible, over the regions on the earth surface where the television signal is to be sent. By way of example, the position of one of the Hot Bird™(13° East) satellites, used to broadcast television signals, is optimal to cover Central Europe. Similarly, orbital positions shifted westwards are used for the Americas, and orbital positions shifted eastwards for Australia.

To ensure the best quality of signals received by earth stations, satellites are equipped with antennas having a radiation pattern shaped to concentrate transmitted power towards areas to be served.

Satellite position on the celestial vault, as seen by the land station is defined by the azimuth and the elevation angles, referred to the geographic North and to the horizon plane respectively, and it obviously varies according to the geographical co-ordinates of the land station itself. In particular, moving towards the poles, the angle between the horizon and the satellite direction, is gradually reduced, while the latitude increases (both Northwards and Southwards).

For this reason, to receive signals from a stationary satellite in the regions near the Equator, it is necessary to aim the antenna almost to the zenith (should the orbital position not coincide with the zenith of the land station, this angle must be recovered by slightly tilting the antenna).

Referring to a nation like Italy and to a stationary satellite like Hot Bird (13° East), the elevation required at Bolzano is of 36.3° and at Ragusa it is of 47.1° (example of maximum and minimum latitude for Italy), with a total excursion of approximately 10 degrees. The use of antennae with a sufficiently symmetrical radiation diagram with respect to the axis, entails therefore the necessity of having to set, at the time of the installation, both the elevation and the azimuth. This is currently performed at the installation of antennae, such as parabolas, both at a position that is fixed or a position that can be remote-controlled by means of mechanical positioning, see by way of example Patent EP0838876 application, or electronic controlled antennae at array with scanning beam, see by way of example U.S. Pat. No. 6,184,827.

Were it is possible to manage just the azimuth angle, installation operation would be simpler, and hence cheaper, and it would be possible to aim at different satellites without changing the elevation.

SUMMARY OF THE INVENTION

These problems are solved by the satellite communication system, being the purpose of this invention, and since it does not require aiming the antenna elevation, it can be installed in any place in a nation like Italy and it therefore enables using, and hence producing and distributing only one antenna model, entailing the reduction of production and storage costs.

The antenna can be installed in a vertical position, adhering to a wall, and this therefore means that it is not so showy, and that it complies with the regulations protecting the inner city urban decor.

A satellite telecommunications system is the particular purpose of this invention.

BRIEF DESCRIPTION OF THE DRAWINGS

These and other characteristics of the present invention shall be clarified better by the following description of a preferred embodiment, given only by way of non limiting example, and by the enclosed drawings in which.

DETAILED DESCRIPTION OF THE INVENTION

The system being the purpose of the invention includes a satellite receiver, to which a set for displaying television programmes can be connected, and an antenna, which as usual shows a sufficiently narrow radiation lobe on the horizontal plane, to discriminate two adjacent satellites. As it is known, television satellites are as a matter of fact spaced from one another by a minimum angle of approximately 3 degrees.

On the other hand on the vertical plane, the antenna shows a lobe which is:

- Wide enough to enable the reception of signal from a certain number of satellites in adjacent orbital positions, by land stations positioned on a certain meridian arc, without the necessity for changing the antenna elevation angle;
- Sufficiently narrow to ensure an adequate gain, by way of example of 30 db.

Figure 1:
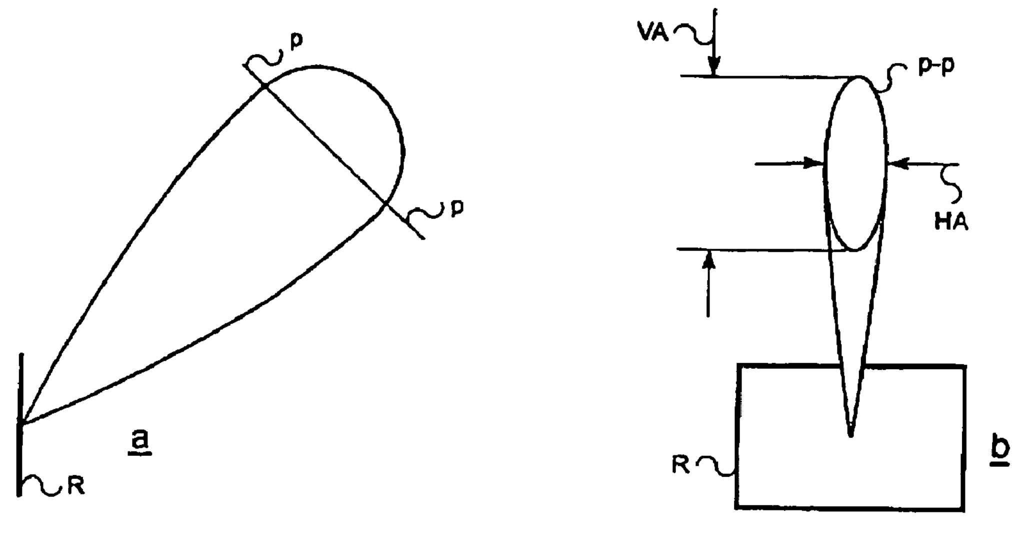
FIG. 1 represents the main lobe of a radiation diagram of an antenna realised according to the invention.

FIG. 1 schematically shows the main lobe of the required radiation diagram, in side view a and in front view b, emitted by a plane surface antenna R. Plane p p cuts the lobe so as to highlight section p—p, having a vertical amplitude VA greater than the horizontal amplitude HA.

A planar antenna having such a radiation diagram, applied to a convenient external wall which “sees” the satellite, can enable the reception of the satellite transmissions after orienting, mechanically or electronically, the main lobe in the direction of the concerned satellite, acting only on one degree of freedom, that is the azimuth.

For what concerns both the movement and the shape of the radiation diagram, it can be useful to resort to array antennae with scanning beam technology. These antennae have a planar structure and are achieved with a large number of radiant components, all of which are equal and equally oriented. They are individually supplied with proper amplitude and phase signals, in order to obtain a radiation diagram showing the main lobe complying with the required elevation and azimuth direction.

The available project tools enable achieving an antenna with the main lobe in the direction of a wide range of azimuth and elevation angles. The lobe itself can moreover be modelled to show the required amplitudes on both the horizontal plane and on the vertical plane. By way of example, a suitable antenna can be used in a nation like Italy, covering a similar meridian arc and showing an equal average latitude, can show a main lobe amplitude on the vertical plane of approximately 10° and on the horizontal plane of 1 to 2°.

Each individual antenna radiant element is placed according to lines and columns in matrix structure, and it is supplied by proper amplitude and phase coefficients through transmission lines arranged according to columns.

Calculation of such coefficients sets the main lobe elevation and amplitude angle, which must be similar to that in FIG. 1.

Each column of elements makes up a vertical sub-array featured by a set elevation angle, which can be repeated in an identical way all over the whole antenna.

All the transmission line inputs supplying the aforesaid sub-arrays are combined in just one input in order to obtain the required main lobe direction on the azimuth plane. There are different techniques for performing this combination. Should just one direction be sufficient, a fixed controller can be used, while should rather the scanning be performed on the azimuth plane, numerical, electronic, RF devices etc. can be used.

The antenna can conveniently be achieved by using the micro-strip technique, according to which both the radiant elements and the supply leads can be made up of metal pads having a more or less wide or thin shape, achieved on a dielectric support.

Figure 2:
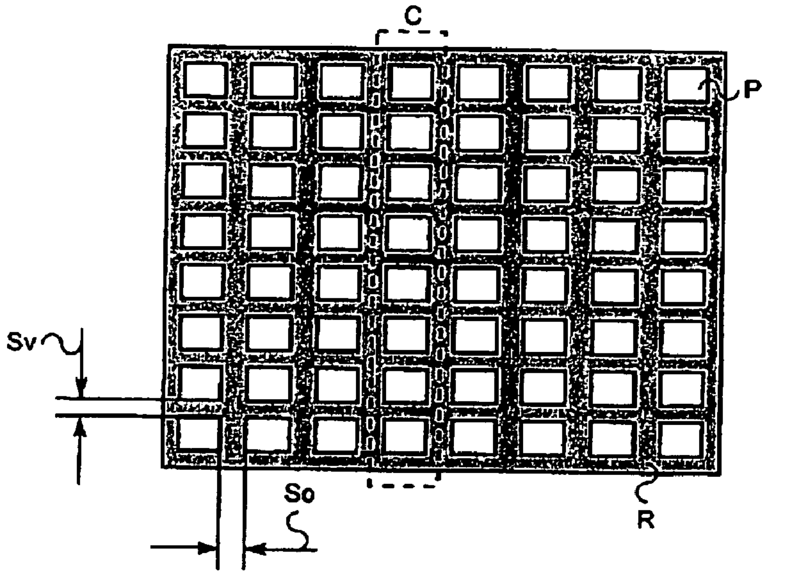
FIG. 2 represents a possible embodiment of an antenna realised according to the invention.

FIG. 2 shows a possible embodiment of the antenna. The radiant structure is achieved on the rectangular plane surface R and it consists of a two-dimension planar array of 8×8 radiant elements on micro-strip P, arranged to make a regular matrix structure. Horizontal spacing So between the elements is not necessarily equal to the vertical spacing Sv.

All the radiant elements belonging to the same column C, achieve a sub-array, supplied by only one line in micro-strip and individual power dividers and phase shifters for each element, in order to generate a radiation diagram, similar to that shown in FIG. 1 in the vertical plane.

Figure 3:
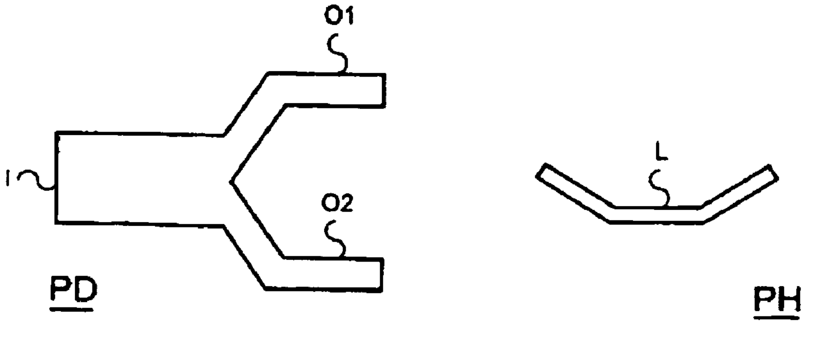
FIG. 3 represents a power divider and an antenna supply network phase shifter.

FIG. 3 shows two basic devices of the antenna supply network. They are a power divider PD, provided with one input I with two outputs O1 and O2 at different power sizes, and a phase shifter PH, introducing a phase displacement $\phi$ along path L.

The just described satellite antenna is only one of the possible achievements suitable to the system being the purpose of the invention. The same functionality can be obtained by means of other technologies. By way of example, two further achievements are proposed. The first achievement consists in actuating the radiant elements by means of horns supplied by proper wave-guides. The second achievement, in lieu of the traditional parabola uses a reflector antenna shaped to generate a diagram similar to that in FIG. 1 and driven by a simple powered positioner to select the azimuth and hence the required satellite.

Obviously the above descriptions are given by way of non limiting examples. Variants and amendments are possible without for this exiting the claim protection field.

The invention claimed is:

1. A satellite telecommunication system comprising: an antenna capable of communicating with only one satellite selected from a plurality of satellites in stationary orbits, said antenna comprising a planar structure array antenna with a scanning beam, said planar structure array antenna comprising an array of radiant elements, said radiant elements being adapted to be individually supplied by convenient amplitude and phase signals in order to obtain a radiation diagram having a main radiation lobe with, on the horizontal plane, a first amplitude between 1 and 2 degrees, and, on the vertical plane, a second amplitude, such as to ensure an adequate gain to enable the reception of signals from said one satellite selected from the plurality of satellites by a satellite telecommunication system positioned in a land station located within a meridian arc corresponding to said second amplitude on the vertical plane, without the necessity of changing an elevation angle of said antenna.

2. The satellite telecommunication system according to claim 1, wherein the direction of said main radiation lobe can be directed at azimuth and elevation angles, and modelled to show said first amplitude on the horizontal plane and said second amplitude on the vertical plane.

3. The satellite telecommunication system according to claim 2, wherein said elements in said array of radiant elements are equal and equally oriented.

4. The satellite telecommunication system according to claim 3, wherein each of said antenna individual radiant elements is arranged according to line and column matrix structure and is supplied with convenient amplitude and phase coefficients through transmission lines arranged in compliance with the columns, the coefficients setting the elevation angle and amplitude of the main lobe.

5. The satellite telecommunication system according to claim 4, wherein each column of antenna individual radiant elements making up a vertical sub-array, shows a certain elevation angle, and is identically repeated all over the whole antenna.

6. The satellite telecommunication system according to claim 5, wherein all transmission line inputs supplying said sub-arrays are combined into one input in order to achieve the required main lobe direction on the azimuth plane.

7. The satellite telecommunication system according to claim 3, wherein said radiant elements are horns supplied by convenient wave-guides.

8. The satellite telecommunication system according to claim 1, wherein said antenna shows a main lobe amplitude on the vertical plane of approximately 10 degrees.

9. The satellite telecommunication system according to claim 1, wherein the antenna is capable of locating said one satellite from among said plurality of adjacent satellites in stationary orbits by adjusting only an azimuth angle of said antenna.

10. An antenna capable of communicating with only one satellite selected from a plurality of satellites in stationary orbits, said antenna comprising: a planar structure array antenna with a scanning beam, said planar structure array antenna comprising an array of radiant elements, said radiant elements being adapted to be individually supplied by convenient amplitude and phase signals in order to obtain a radiation diagram having a main radiation lobe with, on the horizontal plane, a first amplitude between 1 and 2 degrees, and, on the vertical plane, a second amplitude, such as to ensure an adequate gain to enable the reception of signals from said only one satellite selected from the plurality of satellites by a satellite telecommunication system positioned in a land station within a meridian arc corresponding to said second amplitude on the vertical plane, without the necessity of changing an elevation angle of said antenna.

11. The antenna according to claim 10, wherein the direction of said main radiation lobe can be directed at azimuth and elevation angles, and modelled to show said first amplitude on the horizontal plane and said second amplitude on the vertical plane.

12. The antenna according to claim 11, wherein said elements in said array of radiant elements are equal and equally oriented.

13. The antenna according to claim 12, wherein each of said antenna individual radiant elements is arranged according to a line and column matrix structure and is supplied with convenient amplitude and phase coefficients through transmission lines arranged in compliance with the columns, the coefficients setting the elevation angle and amplitude of the main lobe.

14. The antenna according to claim 13, wherein each column of antenna individual radiant elements making up a vertical sub-array shows a certain elevation angle and is identically repeated all over the whole antenna.

15. The antenna according to claim 14, wherein all transmission line inputs supplying said sub-arrays are combined into one input in order to achieve the required main lobe direction on the azimuth plane.

16. The antenna according to claim 12, wherein said radiant elements are horns supplied by convenient waveguides.

17. The antenna according to claim 10, wherein said antenna shows a main lobe amplitude on the vertical plane of approximately 10 degrees.

18. The antenna according to claim 10, wherein the antenna is capable of locating said one satellite from among said plurality of adjacent satellites in stationary orbits by adjusting only an azimuth angle of said antenna.

* * * * *